(12) United States Patent
Winton et al.

(10) Patent No.: US 11,343,602 B2
(45) Date of Patent: May 24, 2022

(54) PASSIVE AUTO-ORIENTING LOUDSPEAKER ASSEMBLY

(71) Applicant: Harman International Industries, Incorporated, Stamford, CT (US)

(72) Inventors: Riley Winton, Opelika, AL (US); Adam Michael Sachs, Royal Oak, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 17/177,320

(22) Filed: Feb. 17, 2021

(65) Prior Publication Data

US 2021/0266652 A1 Aug. 26, 2021

Related U.S. Application Data

(60) Provisional application No. 62/979,512, filed on Feb. 21, 2020.

(51) Int. Cl.
*H04R 1/02* (2006.01)
*B60R 11/02* (2006.01)

(52) U.S. Cl.
CPC .......... *H04R 1/026* (2013.01); *B60R 11/0217* (2013.01); *H04R 2499/13* (2013.01)

(58) Field of Classification Search
CPC .. H04R 1/026; H04R 2499/13; B60R 11/0217
See application file for complete search history.

(56) References Cited

U.S. PATENT DOCUMENTS

| | | | |
|---|---|---|---|
| 6,991,289 B2 | 1/2006 | House | |
| 9,866,951 B2 | 1/2018 | Trestain et al. | |
| 10,873,797 B2 | 12/2020 | Winton et al. | |
| 2003/0142835 A1* | 7/2003 | Enya | H04R 3/12 381/387 |
| 2013/0182883 A1 | 7/2013 | Takeda et al. | |
| 2020/0041878 A1 | 2/2020 | Lan et al. | |

FOREIGN PATENT DOCUMENTS

| | | |
|---|---|---|
| DE | 102015117867 A1 | 2/2017 |
| EP | 3454577 A1 | 3/2019 |

OTHER PUBLICATIONS

European Search Report for Application No. 21158385.1, dated May 28, 2021, 8 pages.

* cited by examiner

*Primary Examiner* — Andrew L Sniezek
(74) *Attorney, Agent, or Firm* — Brooks Kushman P.C.

(57) ABSTRACT

An auto-orienting loudspeaker assembly for a vehicle seat includes a housing arranged to be received within a rear side of the vehicle seat, an enclosure rotatably mounted to the housing, the enclosure having a nonuniform weight distribution, and a loudspeaker disposed within the enclosure and having an initial orientation. A change in an angular position of the vehicle seat results in a passive rotation of the enclosure with respect to the housing to substantially maintain the initial orientation of the loudspeaker as the angular position of the vehicle seat changes.

20 Claims, 3 Drawing Sheets

PASSIVE AUTO-ORIENTING LOUDSPEAKER ASSEMBLY

CROSS-REFERENCE TO RELATED APPLICATIONS

This application claims the benefit of U.S. provisional application Ser. No. 62/979,512 filed Feb. 21, 2020, the disclosure of which is hereby incorporated in its entirety by reference herein.

TECHNICAL FIELD

Embodiments relate to a passive auto-orienting loudspeaker assembly, such as for a vehicle seat.

BACKGROUND

Motor vehicles, such as automobiles, typically have multiple loudspeakers in a fixed arrangement to output audio (e.g., music, audiobooks, etc.) for a driver and passengers in the vehicle. In automotive audio systems, the directionality of loudspeakers is often a major driver for acoustic performance, and fixed loudspeakers are limited in that they cannot change the direction of their audio output. While the inherent directivity of a loudspeaker can only be changed via the design of the transducer, the orientation of the loudspeaker can have just as much of an impact on the sound field and the on quality of the listening experience.

Often designers attempt to arrange loudspeakers within a vehicle so that they are pointed directly at listeners, but this can backfire as no two listeners are of the exact same height, body size, head size, etc. In addition, many vehicle surfaces can move and change, such as seats that recline and/or change position, or armrests that lift and lower. In "sound zone"-type experiences where multiple listeners are trying to listen to multiple types of media, maintaining the correct and intended directionality of a loudspeaker can greatly influence the effectiveness of the entire audio system. As an example, loudspeaker A might be optimized to play audio content only for listener A, and loudspeaker B might be optimized to play audio content only for listener B. However, if loudspeaker A ends up pointed at listener B, listener B would be hearing content from the undesired "zone" and a poor listening experience will result.

SUMMARY

In one or more embodiments, a loudspeaker assembly for a vehicle seat includes a housing arranged to be received within a rear side of the vehicle seat, an enclosure rotatably mounted to the housing, the enclosure having a nonuniform weight distribution, and a loudspeaker disposed within the enclosure and having an initial orientation. A change in an angular position of the vehicle seat results in a passive rotation of the enclosure with respect to the housing to substantially maintain the initial orientation of the loudspeaker as the angular position of the vehicle seat changes.

In one or more embodiments, an auto-orienting loudspeaker assembly for a vehicle seat includes a housing arranged to be received within a rear side of the vehicle seat, and an enclosure rotatably mounted to the housing, the enclosure including a weight member associated with a bottom portion of the enclosure which provides a nonuniform weight distribution of the enclosure. A loudspeaker is disposed within the enclosure and has an initial orientation for directing sound toward a rear end of the vehicle, wherein a change in an angular position of the vehicle seat results in a passive rotation of the enclosure with respect to the housing due to the weight member to substantially maintain the initial orientation and sound direction of the loudspeaker as the angular position of the vehicle seat changes.

In one or more embodiments, an audio system for a vehicle includes at least one loudspeaker assembly mounted in a vehicle seat, the at least one loudspeaker assembly including a housing arranged to be received within a rear side of the vehicle seat, an enclosure rotatably mounted to the housing and having a nonuniform weight distribution, and a loudspeaker disposed within the enclosure and having an initial orientation. A change in an angular position of the vehicle seat results in a passive rotation of the enclosure with respect to the housing to substantially maintain the initial orientation of the loudspeaker as the angular position of the vehicle seat changes. An audio controller is operably coupled to the at least one loudspeaker assembly for controlling parameters of the loudspeaker.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As described above, in order to provide an optimal listening environment, it is desirable to have loudspeakers mounted in vehicle components be maintained in their intended orientation towards vehicle occupants even when those vehicle components change position. In one solution to this problem, motorized or actuated systems may be implemented, but with the disadvantages of greater cost, weight, and complexity which may render such solutions undesirable.

Accordingly, embodiments disclosed herein describe a solution for automatically orienting a loudspeaker towards a specific region of interest without the assistance of motors, actuators, or other active processes. Instead, the disclosed loudspeaker assembly uses passive, mechanical means to maintain the intended and/or optimized orientation of loudspeakers within a vehicle, wherein this passive mechanism may be attached to the vehicle seat structure and may be responsive to the seat recline mechanism.

It is understood that directional terms as noted herein (e.g., front, rear, behind, top, bottom, back, etc.) simply refer to the orientation of various components as illustrated in the accompanying figures and the manner in which components may be oriented relative to the vehicle. Such terms are provided for context and understanding of the embodiments disclosed herein and are not intended to be limiting.

Figure 1:
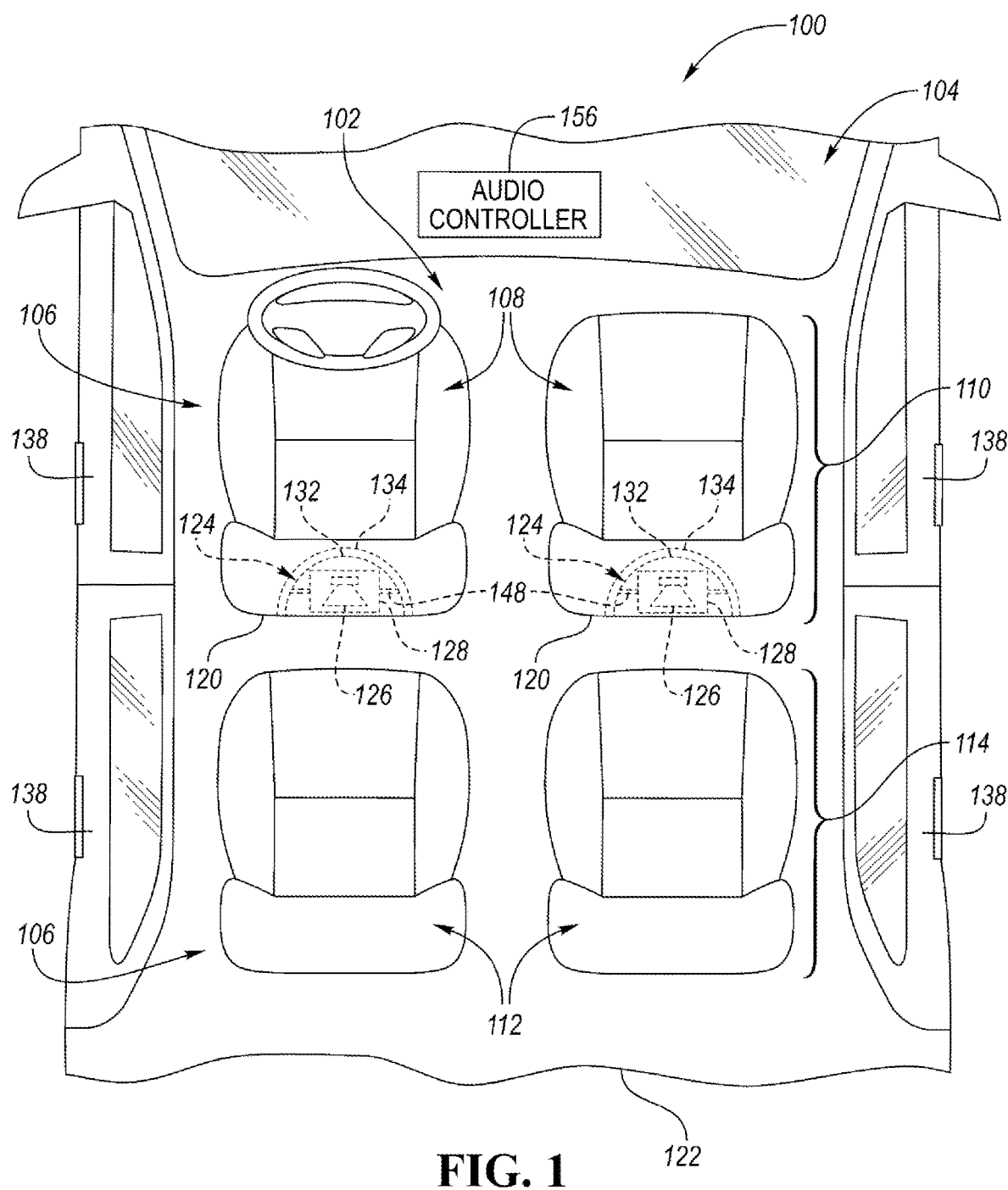
FIG. 1 is a schematic illustration of a vehicle audio system including a loudspeaker assembly mounted in a rear side of a vehicle seat according to one or more embodiments.

FIG. 1 generally depicts a vehicle audio system 100 in an interior cabin 102 of a vehicle 104. The interior cabin 102 includes a plurality of vehicle seats 106, namely a plurality of front seats 108 positioned in a first row 110 and a plurality of rear seats 112 positioned in a second row 114. Each vehicle seat 106 may include a headrest 116 and a backrest 118, and each vehicle seat 106 (and its headrest 116 and backrest 118) has a rear side 120 that faces a rear end 122 of the vehicle 104. It is recognized that the number of vehicle seats and rows in the interior cabin 102 of the vehicle 104 may vary based on the particular type of vehicle 104. For example, the interior cabin 102 may have additional rows including additional vehicle seats positioned behind the second row 114 toward the rear end 122 of the vehicle 104.

Figure 2:
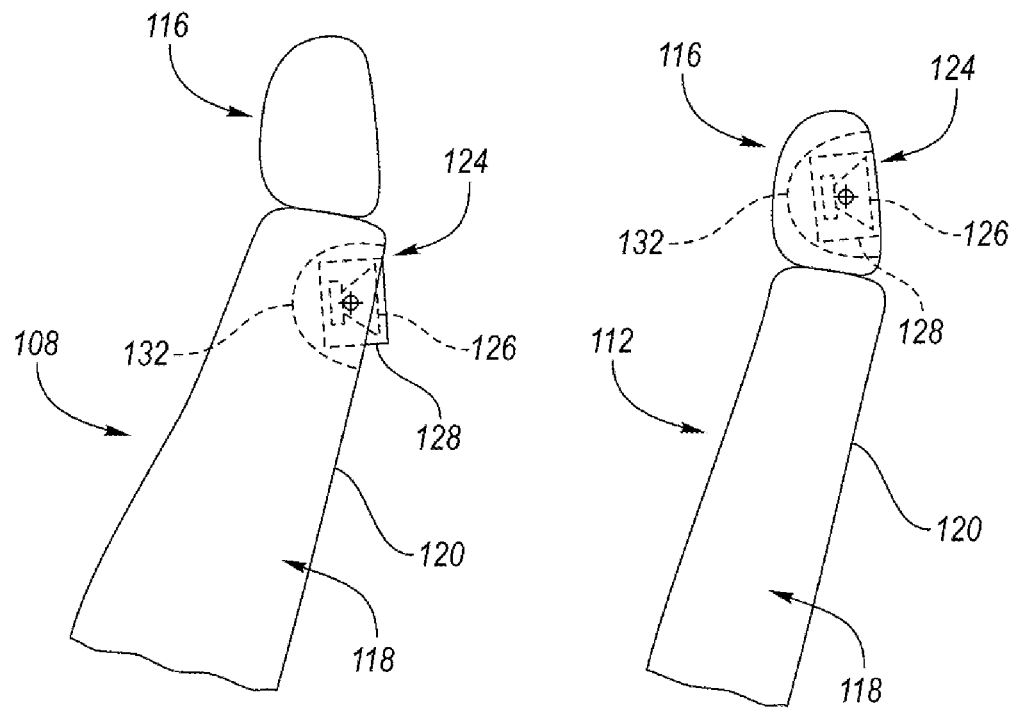
FIG. 2 illustrates a side view of a front vehicle seat having a loudspeaker assembly mounted in a backrest thereof and directed at a rear vehicle seat, and a rear vehicle seat having a loudspeaker assembly mounted in a headrest thereof.

The vehicle audio system 100 may include a plurality of loudspeakers positioned within the interior cabin 102. In particular, a loudspeaker assembly 124 may be mounted in one or more of the vehicle seats 106, specifically on the rear side 120 thereof, and configured to radiate sound toward the rear end 122 of the vehicle. With reference to FIGS. 1 and 2, in one non-limiting example the loudspeaker assembly 124 may be mounted in the backrest 118 of one or both of the front seats 108 for directing audio to the rear seat(s) 112 and its vehicle occupants. A loudspeaker assembly 124 could alternatively or additionally be mounted in the rear side 120 of the headrest 116 of any vehicle seat 106, as exemplary illustrated in FIG. 2. It is recognized that the number of loudspeaker assemblies 124 positioned within each of the headrests 116 and/or backrests 118 may vary based on the desired criteria of a particular configuration of the vehicle 104 and the vehicle audio system 100. Although the audio system 100 and loudspeaker assemblies 124 are generally described herein as being implemented in the rear side 120 of the front seats 108 for directing sound to vehicle occupants in the rear seats 112, it is understood that the audio system 100 is also applicable to implementation of one or more loudspeaker assemblies 124 in any vehicle seat 106, such as a rear side 120 of the rear seats 112 for a third or subsequent row of vehicle seats 106 and its vehicle occupants, depending on the configuration of the vehicle 104.

Figure 3:
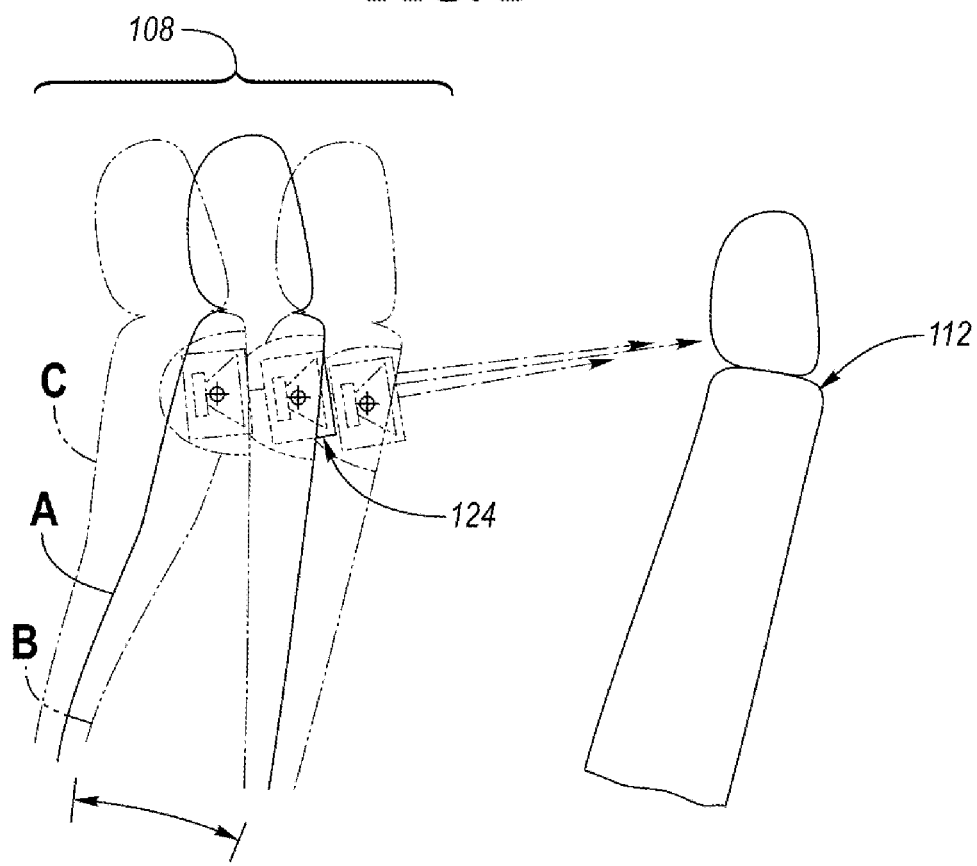
FIG. 3 illustrates a plurality of angular positions of the front vehicle seat and the auto-orienting of the loudspeaker assembly mounted therein.

With reference to FIGS. 1-3, the loudspeaker assembly 124 includes a loudspeaker 126 disposed within an enclosure 128. Although not illustrated in detail, it is understood that the loudspeaker 126 includes the typical components (e.g. motor assembly, voice coil, spider, cone, etc.) for generating sound in response to the electrical signals received. The enclosure 128 may include electronics and wiring (not shown), and may be either sealed or ported. While illustrated herein as being generally rectangular, the enclosure 128 is not limited to this configuration.

The loudspeaker assembly 124 further includes a housing 132 that may be received or embedded in the rear side 120 of the headrest 116 or backrest 118 in the vehicle seat 106, such as the front seat 108. Accordingly, the vehicle seat 106 may include a recess 134 formed therein, wherein the recess 134 is sized and configured to a least partially receive the housing 132. While the housing 132 is depicted as having a generally curved or hemispherical configuration herein, other shapes and configurations of the housing 132 are fully contemplated.

The enclosure 128 is rotatably mounted to the housing 132, as described further below. The enclosure 128 may be mounted in the housing 132 so that the loudspeaker 126 lies generally flush with the rear side 120 of the headrest 116 or backrest 118. In another embodiment, enclosure 128 may be mounted so that the loudspeaker 126 may lie inward from the rear side 120 or outward from the rear side 120. In one or more embodiments, the installation position of the loudspeaker assembly 124 may be configured such that vehicle impact safety requirements are met. This may be accomplished by, for example, recessing the loudspeaker assembly 124 into the foam or other structural housing of the headrest 116 or backrest 118 to minimize impact with any portion of the vehicle occupant's body. It is contemplated that the fabric or leather of the rear side 120 of the headrest 116 or backrest 118 may cover the housing 132 such that only the loudspeaker 126 and enclosure 128 are be visible to vehicle occupants.

In one or more embodiments, the geometry of the housing 132 may serve as a waveguide to control the directivity of the sound field generated by the loudspeaker 126. For example, the housing 132 may be deepened and the enclosure 128 may be mounted in the housing 132 set inward from the rear side 120 to improve isolation of one vehicle occupant's sound field from that of other vehicle occupants. Referring to FIG. 1, instead of the generally centered location of the loudspeaker assemblies 124 shown with respect to the rear side 120 of the vehicle seat 106, the loudspeaker assemblies 124 may be mounted horizontally off-center on the vehicle seat 106, such as mounted offset closer to the vehicle doors 138. By increasing the separation of the loudspeaker assemblies 124 on adjacent vehicle seats 106 in this manner, individual sound zones may be preserved for the vehicle occupants.

As referenced above, the loudspeaker assembly 124 includes a mechanical mounting interface between the enclosure 128 and the housing 132 which allows the enclosure 128 to change position or rotate with respect to the housing 132 as the vehicle seat 106 changes its angle of orientation (e.g. is moved in a more reclined direction or is moved in a more upright direction). Accordingly, the position of the enclosure 128 automatically and passively compensates for a change in angular position of the vehicle seat 106 in order to continue to aim the loudspeaker 126 at the original or desired target point within the vehicle 104. As the angular position of the vehicle seat 106 (e.g. front seat 108) is changed, a passive mechanism accounts for the angle of reclination of the vehicle seat 106 and automatically adjusts the orientation angle of the enclosure 128. The result is a loudspeaker 126 that is always pointing towards the same, desired region of interest, regardless of the angle of the vehicle seat 106.

Figure 4:
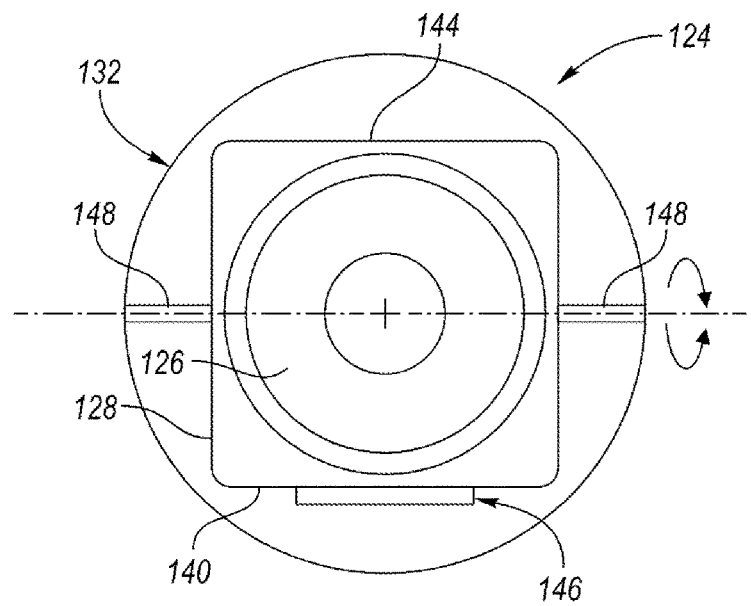
FIG. 4 illustrates a front view of a loudspeaker assembly according to one or more embodiments.

With reference to FIG. 4, a loudspeaker assembly 124 is illustrated according to one or more embodiments, wherein the enclosure 128 may have a nonuniformly distributed weight such that the enclosure 128 and contained loudspeaker 126 are biased to remain in a desired orientation as the angular position of the vehicle seat 106 is adjusted. The nonuniform weight distribution of the enclosure 128 may be accomplished by a material excess or increased material density at a bottom portion 140 of the enclosure 128 (e.g., closest to the vehicle floor 142) as compared with an opposite, top portion 144 of the enclosure 128. Alternatively, the nonuniform weight distribution of the enclosure 128 may be achieved by a weight member 146 associated with the bottom portion 140 of the enclosure, such as embedded within or coupled or affixed to the bottom portion 140. In one or more embodiments, the weight member 146 may be constructed from a non-magnetic material and is not limited to the shape or configuration depicted herein. Other designs which result in nonuniform weight distribution of the enclosure 128 at the bottom portion 140 thereof are also fully contemplated.

The enclosure 128 can be rotatably mounted to the housing 132, such as via pivot shafts 148 rotatably coupling the enclosure 128 to the housing 132 on each side of the enclosure 128. The nonuniform weight distribution of the enclosure 128 will cause the enclosure 128 to rotate with respect to the housing 132 about the pivot shafts 148 when the angle of the vehicle seat 106 is changed, thus maintaining the orientation of the loudspeaker assembly 124 as the vehicle seat 106 is raised or reclined. While the pivot shafts 148 are illustrated as supporting the enclosure 128 for rotation about approximately a central horizontal axis therethrough, the pivot shafts 148 could alternatively support the enclosure 128 for rotation with respect to the housing 132 and the vehicle seat 106 about a different horizontal or vertical location. Furthermore, rotational or translational movement about other axes is also contemplated. In one or more embodiments, it is also contemplated that the enclosure 128 could be removably mounted to the housing 132.

Returning to FIG. 3, the loudspeaker assembly 124 may have an initial or desired orientation when the vehicle seat 106 is in a first or neutral angular position A with respect to the vehicle floor 142. In the first angular position A of the vehicle seat 106, the loudspeaker 126 may have a desired orientation toward a rear seat 112 and its occupant. When the vehicle seat 106 is reclined to a second angular position B (a decreased angle with respect to the vehicle floor 142 as compared with angular position A) or raised to a third angular position C (an increased angle with respect to the vehicle floor 142 as compared with angular position A), the nonuniform weight distribution of the enclosure 128 causes the loudspeaker assembly 124 to automatically and passively rotate with respect to the housing 132 and the vehicle seat 106. As a result of this rotation, the loudspeaker 126 remains in the desired orientation (e.g., the orientation when in angular position A) as the vehicle seat 106 is reclined or raised. Thus, for a loudspeaker assembly 124 mounted in a front seat 108, the loudspeaker 126 remains positioned accurately with respect to the rear seat 112 and its occupant regardless of the angular position of the front seat 108.

Figure 5A:
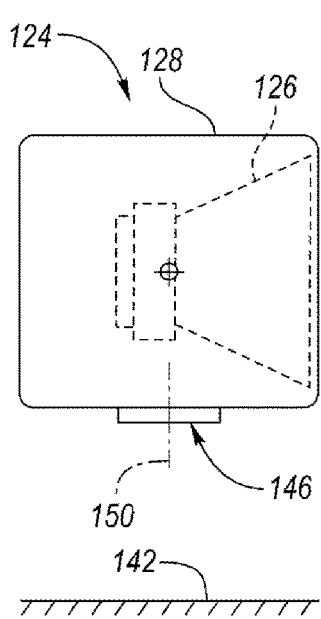
FIGS. 5A, 5B and 5C illustrate side cross-sectional views of a loudspeaker assembly with a weight member in a central position, front position, and back position, respectively, of the bottom portion of the enclosure according to one or more embodiments.
Figure 5B:
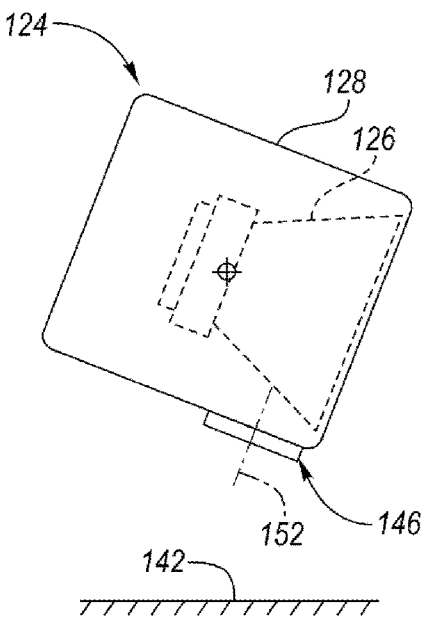
Figure 5C:
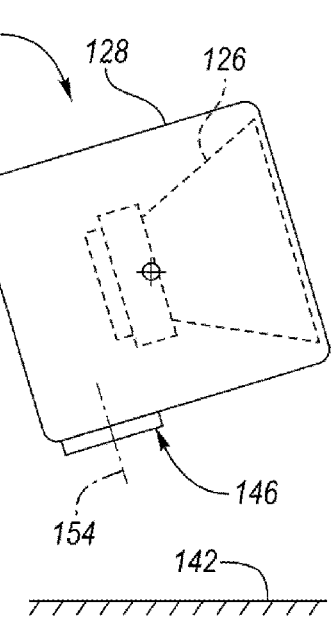

The vehicle audio system 100 may be used by different vehicle occupants at different times, where each vehicle occupant may have unique physical characteristics, such as height or hearing ability. As such, it may be desirable to optimize the initial orientation of the loudspeaker 126 relative to a particular vehicle occupant. Accordingly, in one or more embodiments, it is contemplated that a selective initial positioning of the enclosure 128 may be possible. As illustrated in FIGS. 5A-C, this may be accomplished, for example, by configuring the weight member 146 to be movable, such as slidable or otherwise repositionable, with respect to the bottom portion 140 of the enclosure 128. For example, if the weight member 146 is set at a central position 150 of the bottom portion 140 (FIG. 5A), then an angle of the loudspeaker 126 may be approximately equal to 90 degrees with respect to the vehicle floor 142. However, if the weight member 146 is set at a front position 152 of the bottom portion 140 (FIG. 5B), then the angle of the loudspeaker 126 may be less than 90 degrees with respect to the vehicle floor 142, and if the weight member 146 is at a back position 154 of the bottom portion 140 (FIG. 5C), then the angle of the loudspeaker 126 may be greater than 90 degrees with respect to the vehicle floor 142. Accordingly, the position of the weight member 146 can be selected by the vehicle occupant for optimal initial positioning and sound field acoustics suitable to his or her individual characteristics, and then this selected, optimal orientation or angle is maintained as the vehicle seat 106 is reclined or raised.

As illustrated schematically in FIG. 1, the vehicle audio system 100 may include an audio controller 156 that is operably coupled to each loudspeaker assembly 124. The audio controller 156 may generally include any number of hardware-based processors and memory and may be used for controlling various parameters of each loudspeaker 126 and the resulting acoustical signal. The audio controller 156 may generally process information used in connection with an AM radio, FM radio, satellite radio, navigation system, user interface, display, wireless communication with mobile devices via Bluetooth, WiFi or other wireless protocols, etc. The audio controller 156 may include any number of channels, where each channel may be coupled to a respective loudspeaker 126 via an audio amplifier (not shown) for transmitting the audio signal to the loudspeakers 126.

The one or more loudspeaker assemblies 124 disclosed herein can be used to provide surround or ambience audio content for vehicle occupants. For example, the audio content may provide entertainment through music or dialog, or provide information through instructions or directions. The vehicle audio system 100 may be used as the primary speakers for a sound system or may be added to a conventional audio system to improve the spatial characteristics of stereo or surround sound systems in the vehicle 104.

While the audio system 100 and loudspeaker assemblies 124 are described herein with reference to a vehicle 104 and illustrated in an automobile, the embodiments described herein can also apply to other types of vehicles, such as boats, airplanes, trains and the like, and the vehicle may include any number of loudspeaker assemblies 124. Furthermore, instead of a vehicle, the loudspeaker assembly 124 could be utilized in such home environments as seating in a home theater.

The embodiments disclosed herein improve the listening experience by passively and automatically changing the direction of the loudspeaker 126 to adapt to the current angular position of the vehicle seat 106 in which the loudspeaker assembly 124 is mounted. The disclosed embodiments provide an inexpensive, lightweight and efficient solution to achieve consistent loudspeaker orientation for optimal performance.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A loudspeaker assembly for a vehicle seat, comprising:
   a housing arranged to be received within a rear side of the vehicle seat;
   an enclosure rotatably mounted to the housing, the enclosure having a nonuniform weight distribution; and a loudspeaker disposed within the enclosure and having an initial orientation, wherein a change in an angular position of the vehicle seat results in a passive rotation of the enclosure with respect to the housing to substantially maintain the initial orientation of the loudspeaker as the angular position of the vehicle seat changes.

2. The loudspeaker assembly of claim 1, wherein the vehicle seat includes a backrest and the housing is arranged to be received within the rear side of the backrest.

3. The loudspeaker assembly of claim 1, wherein the vehicle seat includes a headrest, and the housing is arranged to be received within the rear side of the headrest.

4. The loudspeaker assembly of claim 1, wherein the vehicle seat is a front seat in a first row of seats in the vehicle and the loudspeaker assembly directs sound toward a rear seat in a second row of seats in the vehicle.

5. The loudspeaker assembly of claim 1, wherein the enclosure is rotatably mounted to the housing via pivot shafts on each side of the enclosure.

6. The loudspeaker assembly of claim 1, wherein the nonuniform weight distribution of the enclosure includes a weight member associated with a bottom portion of the enclosure.

7. The loudspeaker assembly of claim 6, wherein the weight member is movable with respect to the bottom portion of the enclosure.

8. The loudspeaker assembly of claim 1, wherein the nonuniform weight distribution of the enclosure includes a material excess at a bottom portion of the enclosure as compared with an opposite, top portion of the enclosure.

9. An auto-orienting loudspeaker assembly for a vehicle seat, comprising:
  a housing arranged to be received within a rear side of the vehicle seat;
  an enclosure rotatably mounted to the housing, the enclosure including a weight member associated with a bottom portion of the enclosure which provides a nonuniform weight distribution of the enclosure; and
  a loudspeaker disposed within the enclosure and having an initial orientation for directing sound toward a rear end of the vehicle, wherein a change in an angular position of the vehicle seat results in a passive rotation of the enclosure with respect to the housing due to the weight member to substantially maintain the initial orientation and sound direction of the loudspeaker as the angular position of the vehicle seat changes.

10. The auto-orienting loudspeaker assembly of claim 9, wherein the vehicle seat includes a backrest and the housing is arranged to be received within the rear side of the backrest.

11. The auto-orienting loudspeaker assembly of claim 9, wherein the vehicle seat includes a headrest, and the housing is arranged to be received within the rear side of the headrest.

12. The auto-orienting loudspeaker assembly of claim 9, wherein the vehicle seat is a front seat in a first row of seats in the vehicle and the loudspeaker assembly directs sound toward a rear seat in a second row of seats in the vehicle.

13. The auto-orienting loudspeaker assembly of claim 9, wherein the weight member is movable with respect to the bottom portion of the enclosure.

14. An audio system for a vehicle, comprising:
  at least one loudspeaker assembly mounted in a vehicle seat, the at least one loudspeaker assembly including a housing arranged to be received within a rear side of the vehicle seat, an enclosure rotatably mounted to the housing and having a nonuniform weight distribution, and a loudspeaker disposed within the enclosure and having an initial orientation, wherein a change in an angular position of the vehicle seat results in a passive rotation of the enclosure with respect to the housing to substantially maintain the initial orientation of the loudspeaker as the angular position of the vehicle seat changes; and
  an audio controller operably coupled to the at least one loudspeaker assembly for controlling parameters of the loudspeaker.

15. The audio system of claim 14, wherein the vehicle seat includes a backrest and the housing is arranged to be received within the rear side of the backrest.

16. The audio system of claim 14, wherein the vehicle seat includes a headrest, and the housing is arranged to be received within the rear side of the headrest.

17. The audio system of claim 14, wherein the vehicle seat is a front seat in a first row of seats in the vehicle and the loudspeaker assembly directs sound toward a rear seat in a second row of seats in the vehicle.

18. The audio system of claim 14, wherein the nonuniform weight distribution of the enclosure includes a weight member associated with a bottom portion of the enclosure.

19. The audio system of claim 18, wherein the weight member is movable with respect to the bottom portion of the enclosure.

20. The audio system of claim 14, wherein the nonuniform weight distribution of the enclosure includes a material excess at a bottom portion of the enclosure as compared with an opposite, top portion of the enclosure.

* * * * *